United States Patent

[11] 3,591,315

[72] Inventor James E. Whelan
Dayton, Ohio
[21] Appl. No. 880,072
[22] Filed Nov. 26, 1969
[45] Patented July 6, 1971
[73] Assignee General Motors Corporation
Detroit, Mich.

[54] RECIPROCAL COMPRESSOR AND ACCUMULATOR FOR AUTOMATIC VEHICLE LEVELING SYSTEM
4 Claims, 5 Drawing Figs.

[52] U.S. Cl................................................ 417/363,
417/415, 92/182
[51] Int. Cl......................................................F04b 39/00,
F04b 35/04
[50] Field of Search........................................... 417/363,
415, 312, 569; 92/181, 182, 212

[56] References Cited
UNITED STATES PATENTS
2,772,047  11/1956  Sonnberger.................. 417/363
3,155,312  11/1964  Douglas....................... 417/363
3,224,378  12/1965  Graham....................... 92/182 X Primary Examiner—Robert M. Walker
Attorneys—F. J. Soucek and C. R. Engle ABSTRACT: A reciprocal compressor and accumulator assembly for an automatic vehicle leveling system including auxiliary lift units receiving pressurized fluid from the accumulator when the vehicle is loaded and being pumped down by the compressor when the vehicle is unloaded to maintain a constant vehicle suspension height. The compressor is of a low displacement variety and is driven by a high-speed permanent magnet motor at approximately 3,000 r.p.m. whereby combined with the fact that the compressor receives supercharged air from the auxiliary lift units, the pumpdown time is significantly reduced and the electrical drain on the vehicle battery is held to a minimum. The compressor assembly is suspended on coil springs within the accumulator preventing motor and compressor vibrations from being transmitted through the accumulator to the vehicle and consequently the accumulator may be mounted directly to the vehicle chassis.

PATENTED JUL 6 1971 3,591,315
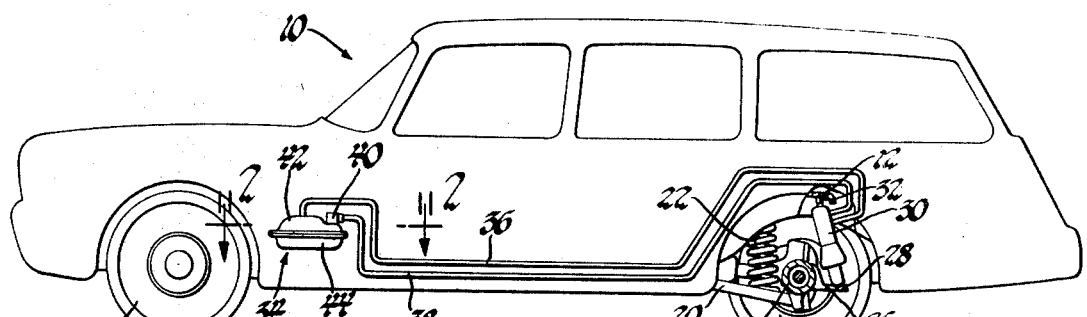
Fig.1
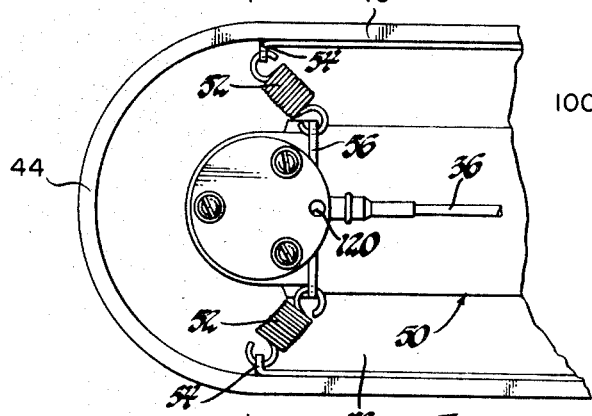
Fig.2
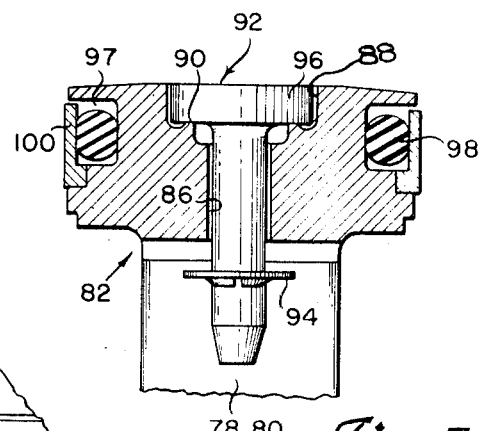
Fig.5
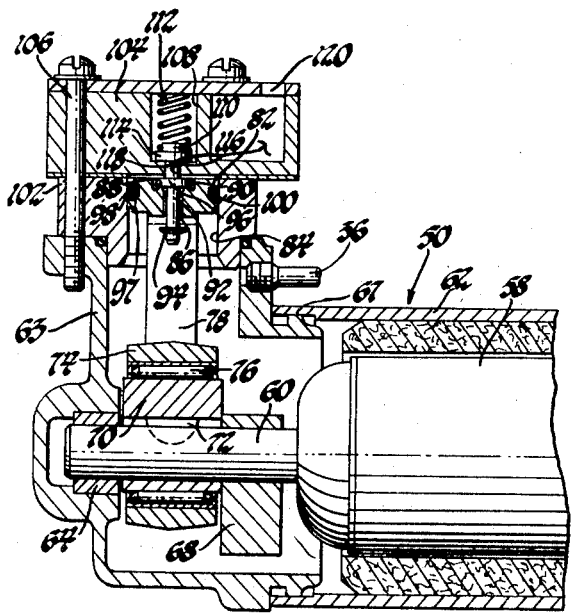
Fig.4
Fig.3
INVENTOR
James E. Whelan
BY
C. R. Engle
ATTORNEY

RECIPROCAL COMPRESSOR AND ACCUMULATOR FOR AUTOMATIC VEHICLE LEVELING SYSTEM

This invention relates to a reciprocal compressor and motor assembly resiliently mounted within a hermetically sealed accumulator and more specifically concerns a high-speed low-displacement compressor wherein pressurized fluid is discharged within the accumulator without transmitting motor and compressor vibrations to supports positioning the accumulator.

Heretofore vehicle leveling systems have often incorporated a pressurized fluid spring unit supplementing the load-carrying capacity of a vehicle suspension system, a pressure source connected to supply pressurized fluid to the spring unit, and a height-responsive member regulating the flow of pressurized fluid to and from the spring unit as the vehicle suspension height changes with loads placed therein. The supply of pressurized fluid has been provided in various manners, among which include utilization of a mechanical pumping device actuated by vertical movements of the suspension system and electrically driven pumps either charging an accumulator or supplying the pressurized fluid directly as required during lifting movements of the fluid spring with the pressurized fluid being discharged to atmosphere during lowering of the spring unit.

A more recent approach to the supplying of pressurized fluid to an auxiliary vehicle spring unit includes incorporation of a motor and compressor unit mounted within an hermetically sealed accumulator tank that is in turn secured in the vehicle undercarriage. Location of the compressor unit within the accumulator prevents the dirt and debris normally collecting on the vehicle undercarriage from interfering with operation of the compressor and its associated motor unit. While the placing of the compressor within the hermetically sealed accumulator tank has improved the operation thereof, it has resulted in an undesirable transmittal of vibrations and/or noises to the vehicle due to the fact that the accumulator tank is directly attached to the vehicle chassis. Purposed of this invention include provision of a motor and reciprocal compressor unit being resiliently mounted within the hermetically sealed accumulator tank wherein the motor is actuated a minimum time to supply the pressure fluid required to actuate a vehicle leveling system without transmitting objectionable noises and vibrations to the vehicle proper. It is also a purpose of this invention to provide a low-displacement compressor being driven at high speeds to rapidly pressurize supercharged inlet fluids.

Accordingly, among the objects of this invention, is the provision of a hermetically sealed accumulator unit having a reciprocal compressor and permanent magnet driving motor assembly resiliently mounted therein in a manner to prevent the transmittal of motor compressor vibrations to the accumulator unit.

Another object of this invention is the provision of a low-displacement high-speed compressor motor arrangement which requires a minimum operational time to supply pressurized fluid to a vehicle leveling accumulator unit.

A further object of this invention is the provision of a reciprocal compressor driven by permanent magnet motor rotating at approximately 3,000 r.p.m. and having an eccentric mounted on the output shaft driving a piston operable within a compressor bore having a displacement of approximately 0.077 cubic inch, both the motor and compressor being resiliently mounted within the hermetically sealed accumulator.

Another object of this invention is the provision of a low-displacement compressor and high-speed permanent magnet motor assembly being resiliently mounted within an hermetically sealed accumulator wherein the compressor receives supercharged fluid from auxiliary vehicle spring lift units during pumpdown of the spring lift units to lower the vehicle in response to a decrease in load therein, the supercharged fluid reducing the operating time of the compressor whereby the current drawn from the vehicle battery is held to a minimum between 5 and 8 amperes with 12-volt supply.

In one system in which the present invention has application, auxiliary fluid spring units in a vehicle leveling system are connected with a crossover tube and the suspension height is sensed by a double-pole double-throw electric switch. The switch is closed in response to the prevailing vehicle suspension height and should the load in the vehicle increase and lower the suspension height, the switch closes a circuit to a solenoid valve opening a passage between the accumulator tank and a conduit to the auxiliary fluid spring units whereupon pressurized fluid is discharged from the accumulator tank to raise the vehicle to a desired height at which time the switch is again opened. In a situation where the vehicle load is removed and the suspension height raises above the desired normal, another circuit is closed with the height-sensing switch energizing the permanent magnet motor whereby the reciprocal compressor is actuated and rapidly withdraws pressurized fluid from the auxiliary fluid spring units through a check valve to the inlet of the compressor whereupon the compressor discharges the further pressurized air for storage within the accumulator tank. Since the reciprocal compressor is a low-displacement compressor receiving supercharged fluid, it rapidly pumps down the units to the normal vehicle height, at which time the circuit is opened drawing a minimum current load from the vehicle battery. It is significant that the compressor motor is only energized during the pumpdown operation. This feature is accomplished by using an accumulator containing approximately 120 cubic inch net volume which is normally charged with fluid at 160—180 p.s.i. for subsequent use in lifting the auxiliary fluid spring units. The pumpdown time with supercharged fluid being supplied to the low-displacement compressor is approximately 1.0— 1.5 minutes versus approximately 5-minutes time being required to pump down like auxiliary fluid springs when the compressor receives fluid at atmospheric pressure. Automatic vehicle leveling systems of the type for which the compressor/accumulator combination is designed normally maintains 115—120 p.s.i. fluid pressure balance between the volumes of the accumulator and the fluid spring units. Upward adjustment of the vehicle to a desired suspension height during heavy load conditions requires approximately 15 seconds and as previously mentioned the compressor is not actuated during a raising cycle.

Further objects and advantages of the present invention will be best understood by reference to the following description taken in conjunction with the accompanying drawings in which:

FIG. 1 is a schematic representation of a vehicle leveling system incorporating the reciprocal compressor and permanent magnet motor assembly located within an hermetically sealed accumulator of the subject invention.

FIG. 2 is a partial top elevational view taken on lines 2–2 in FIG. 1 with the top portion of the accumulator tank removed to show the mounting of the reciprocal compressor and motor within the accumulator tank.

FIG. 3 is a partial sectional view taken on lines 3–3 in FIG. 2 to further illustrate the resilient mounting of the compressor and motor assembly and the details of the piston connecting rod.

FIG. 4 is a partial cross section side elevational view of the compressor and motor assembly showing details of the present invention.

FIG. 5 is a fragmentary view, partly in section, of the compressor piston of this invention.

In FIG. 1 of the drawings a vehicle 10 is illustrated having a lower frame 12 supporting a pair of front wheel assemblies 14 in a usual manner. The vehicle is automatically leveled by moving the rear portion of the lower frame 12 with respect to a ground-supported rear axle assembly 16. The rear axle assembly 16 includes an axle housing 18 which has a pair of spaced-apart control arms 20 pivotally secured to the lower frame 12 at points not shown.

A primary coil suspension spring 22 is carried on each of the control arms 20 adjacent each of the rear wheels 24 to support the vehicle 10 on the lower frame member 12. Rearwardly extending arms 26 are fixedly secured to the axle housing 18 and are connected by a pin 28 to the lower end of auxiliary fluid spring suspension units 30 having their upper ends connected by pins 32 to the lower frame 12 to supplement the load-carrying capacity of adjacent ones of the primary coil suspension springs 22.

The vehicle automatic leveling system illustrated in FIG. 1 comprises an hermetically sealed accumulator 34 having an inlet line 36 and an outlet line 38 regulated by a solenoid valve 40, both the lines 36 and 38 respectively being connected to the spaced auxiliary spring units 30.

The hermetically sealed accumulator unit 34 comprises an upper half 42 and a lower half 44 sealed at a peripheral seam 46, best shown in FIG. 3, to provide a fluidtight reservoir 48. With reference to FIG. 2, a high-speed low-displacement motor compressor assembly 50 is resiliently secured within the reservoir 48 by a plurality of coil springs 52 secured to mounting brackets 54 attached to the accumulator walls and tabs 56 extending from the motor compressor assembly 50. It is apparent from FIG. 3 that the springs 52 are disposed in an angular direction both in the horizontal and vertical planes to resiliently support the motor compressor assembly 50 in a manner preventing transmission of operational vibrations to the accumulator assembly 34.

Referring now to FIGS. 3 and 4, the motor and compressor assembly 50 includes a high-speed permanent magnet motor 58 which operates in the range of 3,000 r.p.m. and comprises an output shaft 60 journaled in a motor casing 62 and a compressor casing 63 by means of bearing assemblies 64, only one of which is shown in FIG. 4. The accumulator 34 contains a vibration cushioning pad 66 disposed underneath the motor casing 62 so that any excessive oscillatory movement of the motor and compressor assembly results in engagement of the motor casing 62 with the pad dampening vibrations prior to transmittal to the accumulator 34. Motor casing 62 is secured to compressor casing 63 at joint 67 in any suitable manner.

The motor output shaft 60 has a counterweight 68 secured thereto and also has an eccentric 70 fixedly secured by conventional fastening means 72 adjacent the counterweight 68. A circular connecting rod end 74 is positioned upon the eccentric 70 and is rotatable thereabout upon a roller bearing assembly 76. A pair of connecting rod struts 78 and 80 best shown in FIG. 3 are integral with the connecting rod end 74 and are also integral with a piston 82, best illustrated in FIG. 5, which is operable within a compressor cylinder or bore 84. The piston 82 contains an axial passage 86 counterbored at 88 to form an annular valve seat 90 cooperating with a reciprocally movable valve assembly 92 slidably positioned within the passage 86 and the counterbore 88. The valve 92 includes a stop member in the form of a spring-gripping washer 94 limiting upward movement thereof and it also terminates in an annular flanged portion 96 which engages valve seat 90 to close passage 86.

The piston 82 further comprises an annular groove 97 receiving an O-ring 98 which biases an L-shaped sealing sleeve 100 outwardly into engagement with the wall of cylinder 84. The piston 82 is of a diameter slightly less than that of the cylinder 84 so that oscillatory and consequently a small amount of lateral movement of the piston is accommodated by the reduction in size of the piston. The biasing force of the O-ring 98 causes the L-shaped sealing sleeve 100 to continually fluid-tightly engage the walls of cylinder 84. The sleeve 100 has a width slightly less than that of annular groove 97 so that a slight amount of pressurized fluid enters the groove behind the sleeve 100 and aids the O-ring 98 in biasing the sleeve against the walls of cylinder 84 during the compression stroke of piston 82.

A cylinder block 102, containing the cylinder bore 84, is closed by a cylinder head 104 secured by means of a plurality of machine bolts 106 threadably received in the compressor casing assembly 63. The cylinder head 104 has a pressure discharge cavity 108 receiving a valve 110 biased to a normally closed position by a coil spring 112. The valve 110 includes an annular flange portion 114 which engages a reduced bore 116 in the cylinder head 104. The cylinder head 104 contains at least a second cavity 118, in fluid connection with the aforementioned pressure discharge cavity 108. A port 120 is provided in cylinder head 104 for discharging pressurized fluid into reservoir 48 within accumulator 34. The arrangement of the cavity 108 in association with at least the second cavity 118 acts as a noise muffler while pressurized fluid is being discharged into the reservoir 48.

In operation, with the accumulator assembly 34 mounted in the undercarriage of the vehicle 10, preferably in the rear of the vehicle near auxiliary spring units 30, the line 38, under influence of solenoid valve 40 that in turn is controlled by a height-sensing controller not illustrated, supplies pressurized fluid to the auxiliary fluid springs 30 positioned adjacent each rear wheel 24. When the vehicle 10 is loaded and the coil springs 22 are compressed, the height-sensing controller energizes a circuit to open solenoid valve 40 and the approximate 120 cubic inches volume of 160—180 p.s.i. fluid within accumulator 34 is immediately supplied through line 38 to the superlift units 30 raising the vehicle suspension until the controller deenergizes the circuit to solenoid valve 40.

When some of the vehicle load is removed and the coil springs extend above a normal desired height, the height controller completes another circuit to the high-speed permanent magnet motor 58 whereupon the compressor is immediately set into operation. The compressor is of the low-displacement type wherein the piston 82 operates with an approximate ¼-inch stroke within the ⅝-inch bore providing an approximate 0.077 cubic inch displacement.

Due to the fact that the inlet line 36 to the compressor receives pressurized air in the range of 115—120 p.s.i. from the auxiliary fluid spring units 30, the compressor assembly rapidly pumps down the lift units in approximately 1.0—1.5 minutes versus an approximate 5-minutes time required when the compressor of this type receives inlet fluid at atmospheric pressure. During the pumpdown cycle the compressor is discharging fluid at the previously mentioned 160—180 p.s.i. range into the reservoir 48.

Downward movement of the piston 82 results in valve 92 being moved upwardly allowing the supercharged fluid, drawn into the compressor area below piston 82 as shown in FIG. 4, to enter the space between the upper surface of the piston 82 and the lower surface of the cylinder head 104. Directing the inlet supercharged fluid to a space below the piston provides for a balance of pressure on either side of the piston 82 making the compressor easier to start when it is necessary to pump down the auxiliary fluid spring units 30. A check valve which is not illustrated may be placed in the conduit 36 preventing backflow of pressurized fluid to the auxiliary spring units 30. While piston 82 is in its downward stroke, the coil spring 112 biases valve 110 closed.

During the compression stroke of the piston 82, the valve flange 96 is moved into engagement with the annular valve seat 90. Consequently the pressurized air cannot flow through or around the piston 82 due to the pressurized air entering annular groove 97 and aiding O-ring 98 in biasing the sleeve seal 100 into engagement with the walls of cylinder 84. When the piston 82 reaches its top dead center position, the valve 110 is opened due to the fluid pressure in cylinder 84 overcoming the combined forces of the spring 112 and the prevailing fluid pressure in the accumulator 34. The pressurized air is then allowed to pass into cavity 108 and subsequently exit through the port 120 providing the necessary reserve supply of pressurized fluid in reservoir 48.

From the above description it is apparent that this system provides an arrangement for rapidly pumping down auxiliary fluid spring units 30 when the suspension height becomes above a normal desired level, the pumpdown time being approximately 1.0—1.5 minutes. The supply of supercharge pressure to the inlet conduit 36 of the motor compressor assembly 50 greatly enhances its operation and this fact coupled with the placement of the inlet line below the piston 82 so that the pressure is readily balanced on either side thereof, the pumpdown time is reduced to a minimum time of between 1.0 and 1.5 minutes. It is also significant that the lifting time is subsequently reduced because an adequate supply of pressurized fluid is provided in the accumulator chamber 48, only 15 seconds being required to upwardly adjust the car to a desired suspension height.

Another important aspect of this invention is the resiliently mounting of the motor compressor assembly within the accumulator reservoir 48 by means of the angularly disposed coil springs 52 thereby preventing any operational vibration of the compressor and motor assembly 50 from being transmitted to the accumulator assembly 34. Additionally the nonmetallic cushioning member 66 further dampens vibration of the compressor and motor assembly 50 enhancing the above-mentioned advantageous quiet operational qualities. These features allow the accumulator 34 to be mounted directly to the vehicle undercarriage without any concern for the transmittal of objectional vibrations to the passenger compartment. Enclosure of the low-displacement high-speed assembly within the accumulator 34 also prevents any foreign matter from entering into the operational components of the assembly and consequently longer life characteristics are obtained.

While a preferred embodiment of the subject invention has been previously described it is included for illustrative purposes only.

I claim:

1. A low-displacement reciprocal compressor assembly resiliently mounted within a hermetically sealed accumulator comprising a high-speed permanent magnet electric motor including an output shaft, an eccentric fixedly mounted on said shaft, a compressor housing, said housing containing a compressor cylinder, a cylinder head enclosing said compressor cylinder, an integral connecting rod and piston assembly rotatably mounted on said eccentric producing oscillatory movement of said piston within said cylinder, said connecting rod including a pair of spaced struts interconnecting a common end rotatably mounted on the eccentric and said piston, said piston having an axial opening connecting the space between said struts and the compressor cylinder serving as an inlet to the compressor cylinder above said piston, a valve member slidably mounted in said opening movable to an open position allowing flow therethrough during retracting movement of said piston and movable closed during compression movement of said piston, said piston having an annular groove machined therein, and O-ring seal positioned in said groove, a sleeve-type teflon seal positioned over said O-ring seal, said sleeve seal having a dimension slightly less than the width of the piston groove permitting entrance of pressurized fluid behind said seal continually urging it into engagement with said compressor cylinder, said cylinder head containing a pressurized fluid discharge port connecting with the compressor cylinder, a spring biased valve normally closing said discharge port, and said compressor housing having an inlet passage underneath said piston so that supercharged inlet air to said piston balances pressure on either side of said piston, said motor driving said compressor at approximately 3,000 r.p.m. and said compressor having approximately 0.077 cubic inch displacement whereby a short rapid piston stroke rapidly compresses supercharged inlet fluids.

2. A low-displacement fluid compressor comprising in combination a high-speed permanent magnet electric motor including an output shaft, an eccentric member fixedly mounted on said shaft, a compressor housing, a motor housing connected to said compressor housing enclosing said permanent magnet motor, said compressor housing containing a compressor bore, a cylinder head enclosing said compressor bore, a connecting rod rotatably mounted on said eccentric and including a pair of spaced struts, a piston positioned within said compressor bore, said spaced struts connected to said piston so that rotation of said eccentric actuates said connecting rod and said struts oscillating said piston within said compressor bore, said piston having an axial passage therethrough connecting the space between said struts and the compressor bore above said piston, a valve member slidably mounted in said passage allowing the flow of fluid therethrough during the downstroke of said piston and obstructing the flow of fluid therethrough during the upstroke of said piston, a discharge passage in said cylinder head, a spring-biased valve in said discharge passage preventing the entrance of fluid through said cylinder head during the downstroke of said piston, and an inlet passage in said compressor housing below said piston balancing the pressure fluid on either side of said piston, the combination of the high-speed permanent magnet electric motor and the low-displacement compressor providing rapid pressurization of supercharged inlet fluid.

3. A low-displacement fluid compressor assembly having particular use in a vehicle-leveling system comprising a high-speed permanent magnet electric motor including an output shaft, a housing enclosing said motor, resilient supports circumferentially spaced within said housing to isolate vibrations of said motor from said housing, an eccentric mounted on said output shaft, a connecting rod comprising a circular end, a plurality of needle roller bearings rotatably mounting said end upon said eccentric, a piston, a pair of spaced struts connecting said piston to said eccentric, a compressor housing, said housing containing a cylindrical compressor bore receiving said piston, a cylinder head enclosing said cylindrical bore, an axial passage through said piston, a valve slidably positioned in said piston axial passage permitting flow of fluid through said piston to the upper side thereof during retracting movement of the piston and compression movement of said piston closing said valve, said cylinder head containing a discharge passage, a spring-biased valve mounted in said discharge passage regulating flow therethrough preventing reverse flow into said cylindrical compressor bore during retracting movement of said piston, and an inlet passage in said compressor housing below said piston balancing the fluid pressures on either side of said piston, the combination of said high-speed motor and said low-displacement compressor providing a compact quiet operating unit that rapidly pressurizes supercharged inlet fluid.

4. A low-displacement reciprocal compressor assembly resiliently mounted within a hermetically sealed accumulator comprising a high-speed permanent magnet electric motor including an output shaft, an eccentric fixedly mounted on said shaft, a compressor housing, said housing containing the compressor bore, a cylinder head enclosing said compressor bore, an integral connecting rod and piston assembly rotatably mounted on said eccentric producing oscillatory movement of said piston within said bore, said connecting rod including a pair of spaced struts, said piston having a fluid inlet axial opening connecting a space between said struts and the compressor bore above said piston, a valve slidably mounted in said opening being opened allowing flow therethrough during downward movement of said piston and being closed during upward movement of said piston, said valve member comprising a stem portion extending through said piston into said axial passage and having a diameter less than that of said axial passage allowing the passage of fluid therearound, a stop member secured to said valve stem limiting upward movement of said valve during downward movement of said piston, said piston having an annular groove an therein, an O-ring positioned in said groove, an L-shaped sleeve seal positioned in said groove over said O-ring, said O-ring biasing said sleeve seal into engagement with said compressor bore, said sleeve seal having a dimension slightly less than the width of the piston groove allowing pressurized fluid to enter the groove behind said seal continually urging it into engagement with the compressor bore, said cylinder head containing a fluid discharge cavity in alignment with the axial passage through said piston, the cavity terminating in a reduced bore juxtaposed to said piston when the latter is in its top dead center position, a discharge valve positioned in said cavity, a coil spring biasing said valve to a closed position, upward movement of said piston pressuring fluid in the compressor bore unseating said discharge valve whereby pressurized fluid flows into said discharge cavity, at least a second cavity in said cylinder downstream of and arranged in association with said discharge cavity for muffling noise of fluid flowing therethrough, said cylinder head containing a discharge port in fluid communication with said second cavity exiting the pressurized fluid into said accumulator, and said compressor housing having an inlet passage underneath said piston balancing the inlet fluid on either side of the piston, said motor driving said compressor at approximately 3,000 r.p.m. and said compressor having an approximate 0.077 cubic inch displacement whereby a short rapid piston stroke rapidly compresses supercharged inlet fluids.

PO-1050
(5/69)

UNITED STATES PATENT OFFICE
CERTIFICATE OF CORRECTION

Patent No. 3,591,315                           Dated July 6, 1971

Inventor(s) James E. Whelan

It is certified that error appears in the above-identified patent and that said Letters Patent are hereby corrected as shown below:

Column 1, line 39, "Purposed" should be -- Purposes --.
Column 5, line 7, "subsequently" should be -- substantially --.
Column 6, line 65, "an" (second occurrence) should be -- machined --.

Signed and sealed this 11th day of January 1972.

(SEAL)
Attest:

EDWARD M.FLETCHER,JR.                ROBERT GOTTSCHALK
Attesting Officer                    Acting Commissioner of Patents